Oct. 22, 1963 W. W. CUSHMAN 3,107,713
PNEUMATIC TIRES AND REPLACEABLE TREADS THEREFOR
Filed Feb. 26, 1962 2 Sheets-Sheet 1

INVENTOR.
WALTON W. CUSHMAN
BY
*B. P. Fishburne, Jr.*
ATTORNEY

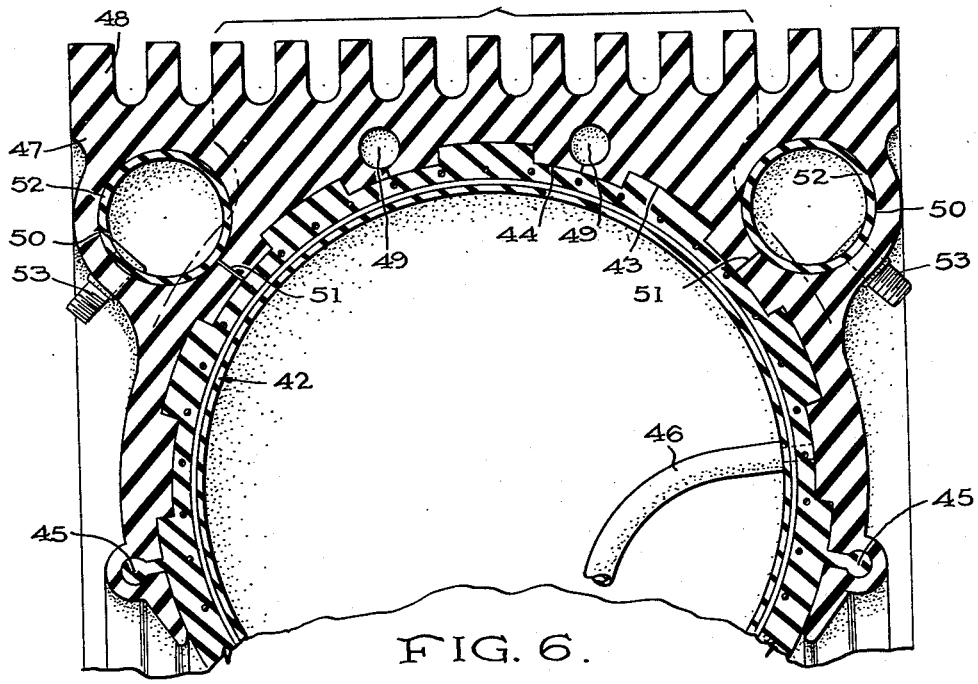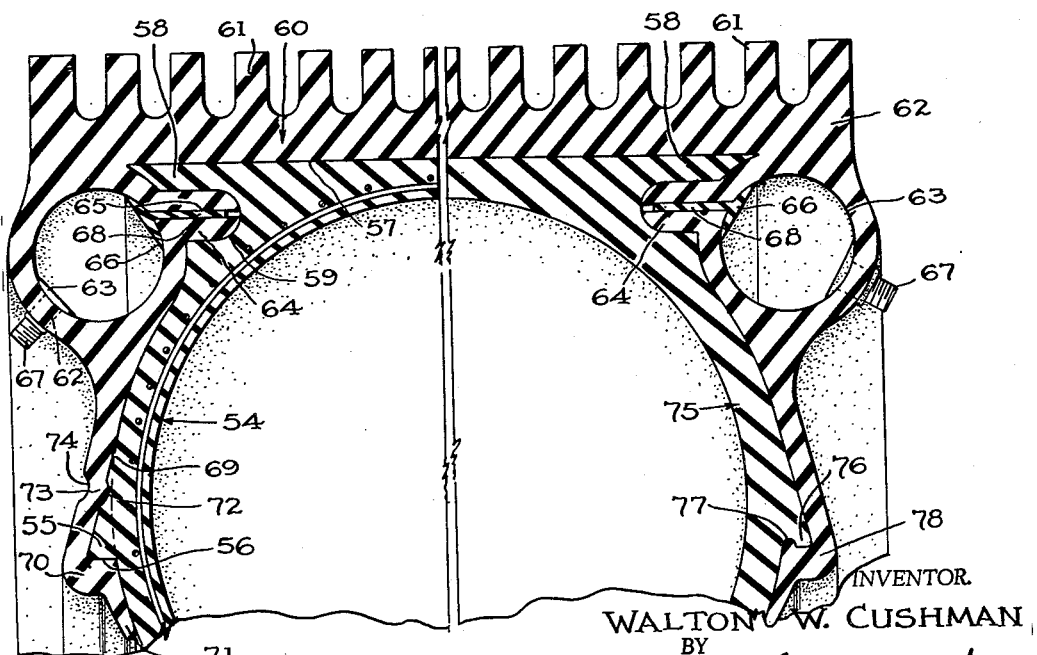

3,107,713
PNEUMATIC TIRES AND REPLACEABLE
TREADS THEREFOR
Walton W. Cushman, 401 N. Penn St., Webb City, Mo.
Filed Feb. 26, 1962, Ser. No. 175,599
12 Claims. (Cl. 152—187)

This invention relates to pneumatic tires and more particularly to pneumatic tires having replaceable treads.

A prime object of the invention is to provide removable and replaceable treads for pneumatic tires which may be readily manipulated without even the necessity for deflating the basic tire carcass and which are retained on the tire carcass at least in part by atmospheric pressure.

Another object of the invention is to provide readily replaceable treads for pneumatic tires which allows the user to employ various tread formations including high speed treads and heavy duty snow treads and the like and treads of varying width on the same basic tire carcass.

A further object is to provide replaceable tire treads which may include internal voids and independently inflatable shoulder compartments where desirable.

Another object is to provide a replaceable tread for pneumatic tires which may be formed entirely from elastomers which are not ordinarily suitable for bonding, curing and vulcanization to an ordinary tire carcass having reinforcing fabric therein, and which elastomers have highly desirable characteristics including resistance to wear, softness, silence of operation and the like.

Another important object is to provide replaceable tire treads which do not depend solely upon resistance to stretching and internal reinforcing means to retain them snugly and fixedly upon the inflated carcass.

Another object is to provide removable elastomer treads which are sufficiently soft to permit folding or rolling thereof for convenient storage, as well as extreme ease of application to or removal from the basic carcass.

Still another object is to provide tread structures of the mentioned character which may be formed in and readily removed from a single piece mold.

Another object is to provide a vacuum mounted replaceable tread which is inherently self-sealing against leakage.

Other important objects and advantages of the invention will be apparent during the course of the following description.

Figure 1:
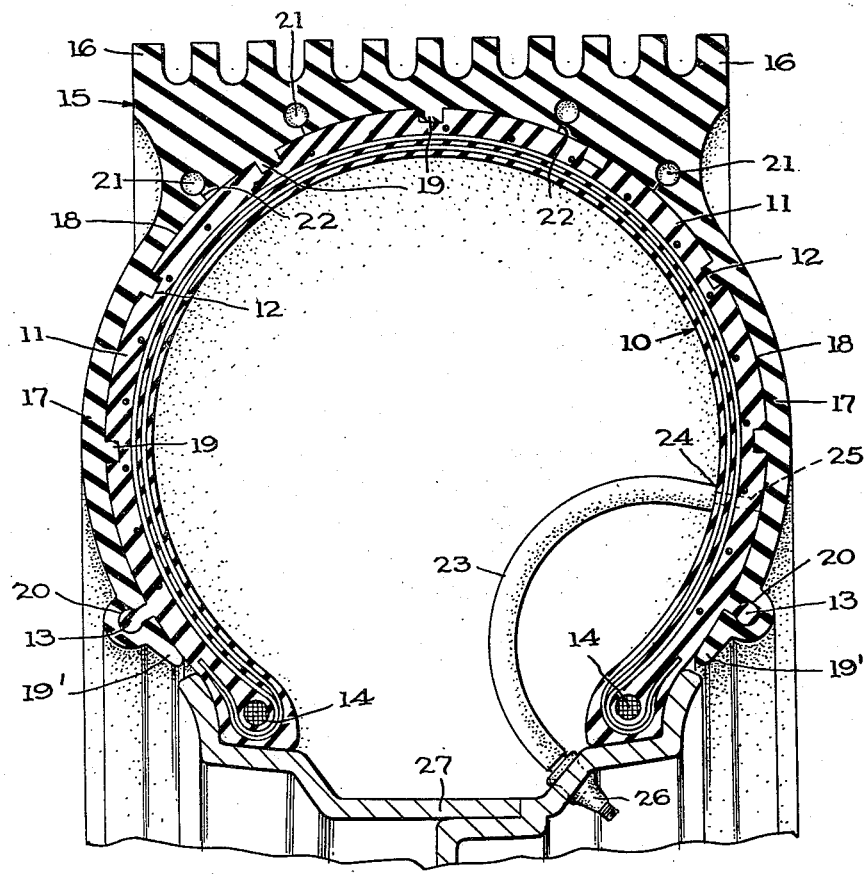
Figure 2:
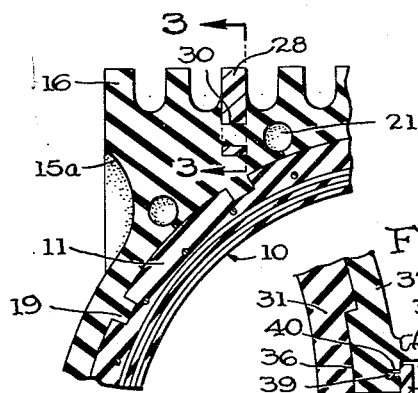
Figure 3:
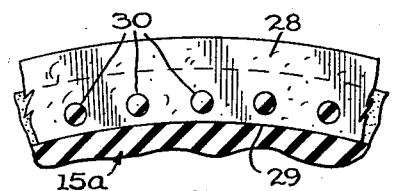
Figure 4:
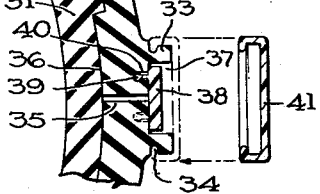
Figure 5:
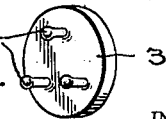

In the accompanying drawings forming a part of this application and in which like numerals are employed to designate like parts throughout the same, FIGURE 1 is a partly diagrammatic radial cross section through a pneumatic tire including a replaceable tread structure in accordance with one preferred embodiment of the invention, FIGURE 2 is a fragmentary radial section through a tire carcass and tread embodying a modification of the invention, FIGURE 3 is a fragmentary vertical section taken on line 3—3 of FIGURE 2, FIGURE 4 is a partly exploded fragmentary radial section through a modified form of evacuation and check valve employed on the removable tread structure, FIGURE 5 is a perspective view of a disc valve element shown in FIGURE 4, FIGURE 6 is a fragmentary radial section through a tire carcass and tread according to another modification, FIGURE 7a is a similar view illustrating a further modification of the invention, FIGURE 7b is a similar view illustrating yet another modification of the invention.

In the drawings, wherein for the purpose of illustration are shown preferred embodiments of the invention, attention is directed first to FIGURE 1, wherein the numeral 10 designates generally a pneumatic tire carcass of generally conventional construction except that the usual tread is omitted therefrom. The carcass 10 may be formed of conventional material and may be provided with the usual internal fabric reinforcing means as diagrammatically shown. The external surface of the annular carcass 10 is formed to provide any preferred number of preferably equidistantly spaced continuous annular rib lugs 11, separated by alternate annular grooves 12. The rib lugs and grooves may vary in number and in cross sectional shape and a wide range of variations in this respect is contemplated. At least a pair 13 of vacuum sealing lugs are formed exteriorly upon the side wall portions of the carcass 10, preferably near and radially outwardly of the rim engaging beads 14, as shown. The vacuum sealing lugs 13 may also vary widely in cross sectional shape and size and their radial location on the carcass 10 may vary. In some instances, the lugs 13 may be arranged somewhat further outwardly of the beads 14 and closer to the tire tread and this is particularly true in connection with low speed heavy duty tires of the type commonly employed on tractors and the like. The lugs 13 are integral with the carcass 10 and they are annular and extend around the entire circumference of the carcass.

The readily replaceable tire tread is designated generally by the numeral 15 in FIGURE 1 and is adapted to be formed entirely by molding from preferably relatively soft elastomers such as the polyurethanes, butyl and the like. The elastomer tread preferably has no internal or embedded reinforcing fabric or like means and is preferably soft enough so as to be easily foldable and capable of being rolled for storage purposes and for ease of manipulation during application to and removal from the basic carcass 10. According to the invention, various soft elastomers including those mentioned and others may be employed in the formation of the tread 15 to provide superior resistance to wear, soft riding characteristics, resistance to skidding, silence of operation, and other desirable qualities presently unavailable in conventional tires. A very important feature of this invention resides in the use of certain elastomer compositions which could not heretofore be successfully employed in pneumatic tires or tire treads due to the inability of the materials to bond to the reinforcing fabrics so necessary to acceptable carcass strength. With the present invention, the much sought-after qualities inherent in these mentioned elastomers are successfully utilized in conjunction with the conventional basic carcass 10 without any sacrifice in overall tire strength or safety and with greatly increased or improved operating characteristics.

The replaceable tread structure 15 shown in FIGURE 1 has a standard width road engaging tread portion 16 whose design may vary infinitely from the usual high speed silent tread designs to heavy snow and mud gripping lugs as the need demands. In this connection, the user of the invention may readily remove the tread structure from the inflated carcass and replace the same without any special tools with another tread structure having a tread design to meet the required road or weather conditions at a minimum expense and with minimum labor.

The tread structure further includes integral side wall portions 17 which may surround or encompass the major portion of the carcass 10 as shown in FIGURE 1. In some instances and particularly in connection with heavy duty tractor tires and the like, the side wall portions of the tread structure may terminate substantially further outwardly from the beads 14 or substantially closer to the tread 16.

The inner face of the tread structure 15 is provided with uniformly spaced annular grooves 18 and alternate radially inwardly projecting annular ribs 19 for interlocking engagement with the rib lugs 11 and grooves 12 of the carcass 10. The primary purpose of the interlocking rib and groove arrangement is to restrain the demountable tread structure 15 from any lateral misalignment on the carcass 10, particularly during cornering and the like of the vehicle equipped with the invention. Near and outwardly of the inner extremities 19' of tread side wall 17, receiving chambers 20 for the vacuum sealing lugs 13 are provided, and these chambers open through the inner face of the tread side walls and extend continuously around the entire circumference thereof. The particular shape of the chambers 20 in cross section may be varied and in each case, the chambers preferably conform to the cross sectional shape of the sealing lugs 13.

The replaceable tread may be provided near and inwardly of the tread portion 16 with any desired number of internal annular voids 21 of any preferred cross sectional shape, molded therein and having radial slits 22 leading from their inner sides and opening through the inner face of the tread structure, and being separable to permit ready removal of the mold. These internal voids render the tread structure more resilient for enhanced riding qualties and they render it lightweight and effect economy of material. They also reduce the amount of heat generated internally by hysterisis, such heat generation being excessive where the thickness of the elastomeric tread is relatively great. The voids 21 may be omitted entirely from the tread structure in some instances and the number, size and shape of the annular voids may be greatly varied as previously suggested.

Means are provided to evacuate the almost negligible space between the carcass 10 and the surrounding removable tread structure. Such means may comprise a tube 23 having on end integrally joined with the carcass 10 in a fluid tight manner at 24, in registration with a small radial bore 25 formed through the carcass and communicating with the space to be evacuated. The tube 23 has its other end leading to and connected with a suitable vacuum fitting 26 conventionally mounted within an opening of the wheel rim 27. The fitting 26 may in fact be a conventional tubeless tire inflating valve positioned in reverse to the usual arrangement for inflating a tire. The tube 23 is enclosed, concealed and protected by the carcass and rim as shown in FIGURE 1. An additional inflating valve, not shown, is mounted upon the rim 27 at a different location to inflate the carcass conventionally.

Relatively slight vacuum is required to adequately "lock" the tread structure to the tire carcass because of the negligible volume or space to be evacuated. The required vacuum may be obtained from an ordinary tire inflation air line using a jet-type conversion unit which is readily available. In some instances, sufficient vacuum may be obtained directly from the vehicle engine manifold through means similar to the windshield wiper connection in most automobiles.

In addition to the effect of the vacuum securing feature for the tread structure, the same snugly engages the carcass 10 and is removably interlocked therewith mechanically and this mechaical action is increased by the inherent softness and gripping properties of the elastomers which are employed for making the tread structure. In fact, the mechanical gripping and adhering properties of such elastomers are so effective in relation to the conventional carcass 10 that in certain heavy duty low speed tire applications it may be possible to omit the vacuum securing feature entirely and satisfactory results can still be obtained with the construction shown and described.

In most applications including pleasure vehicle tires, subject to high speed operation, the vacuum securing feature is essential to assure substantially perfect "bonding" or attachment of the tread structure to the carcass 10. It is imperative that there be no relative movement during operation between the carcass and tread structure even at the bottom of the tire which is flattened at the region of engagement with the road. Any slippage between the tread structure and carcass would create excessive heat and wear which would be highly undesirable and even dangerous. The combined mechanical gripping action of the all elastomer tread structure with the carcass 10 and the added effect of the vacuum securing feature substantially completely eliminates the objectionable relative movement or slippage between the two elements of the composite tire, and this constitutes a key feature of the invention.

In FIGURES 2 and 3, there is shown a slight modification of the invention whereby one or more annular tread inserts 28 of a different elastomer from that employed in the tread structure proper may be utilized to take advantage of the varying physical characteristics of certain elastomers including resistance to wear and abrasion, increased traction, and other like properties. Each insert 28 may be incorporated in the tread structure 15a, FIGURES 2 and 3, by molding, during manufacturing of the tread structure. Each insert is positioned within an annular groove 29 of the tread structure and each insert may have circumferentially spaced openings 30 formed therethrough, into which the material of the tread structure 15a may flow during molding to anchor the insert securely. The inserts 28 may vary as to material, they may vary in number and in shape or design to be compatible with a particular tread design and to provide the desired physical and operating characteristics in the tread structure. All other parts are identical with the corresponding parts shown and described in the form of the invention depicted by FIGURE 1.

In FIGURES 4 and 5, there is shown a modified form of evacuating valve for the tread structure particularly adapted to tires employing inner tubes and heavy duty tires of the type used on tractors where the side wall portions of the removable tread may be shorter than the side wall portions 17 in FIGURE 1. In FIGURE 4, the side wall portions of the basic carcass and tread structure are indicated at 31 and 32 respectively. The tread side wall portion has an outwardly projecting recessed boss 33 integral therewith having a surrounding annular groove 34. A small radial port 35 is formed through the tread side wall portion 32 in communication with the space 36 to be evacuated and the recess 37 of boss 33. An elastomer disc valve element 38 is disposed loosely in the recess 37 and preferably has forwardly projecting ball headed legs or pins 39 integral therewith for piloting engagement within small openings 40 at the bottom of the recess 37. The disc valve element 38 is adapted to seal the port 35 when the space 36 is evacuated but shifts outwardly slightly to uncover the port 35 when suction is applied at the mouth of the recess 37. An elastomer cap 41 is preferably provided to cover the boss 33 and recess 37, as shown, to exclude dirt and provide a further check against the loss of vacuum in the space between the basic carcass and the tread structure. When vacuum is applied to the mouth of the boss 33, the disc valve element 38 opens automatically to allow evacuation of the space 36. When the proper vacuum is developed in the space 36, the disc valve element will be seated by atmospheric pressure to seal the port 35. Obviously, the valve construction shown in FIGURES 4 and 5 eliminates the necessity for the tube 23 and the vacuum fitting 26, shown in FIGURE 1. If desired, the valve structure of FIGURE 4 may be utilized instead of the tube 23 and associated elements in the embodiment of FIGURE 1 and also in the embodiments of FIGURES 6, 7a and 7b presently to be described.

In FIGURE 6 a modification of the invention is illustrated wherein a tire structure is provided having an effective tread width which may be approximately double that of a conventional automobile tire. Such a tread is particularly advantageous for mud and snow tires and can be employed advantageously anytime if desired. When the wide tread is employed, the ground pressure will be only about one-half that of normal width tires with resulting improved performance and greatly reduced wear. The wide tread will also help to alleviate the characteristic flat-spotting of certain elastomers. If preferred, tread inserts of the character shown at 28 in FIGURE 2 of a different elastomeric composition may be employed to impart to the tread the desired performance or operating qualities.

In FIGURE 6, the basic carcass with conventional internal reinforcement is shown at 42. The carcass 42 is provided upon its outer face with rib lugs 43 and alternately arranged grooves 44 generally similar to the lugs 11 and grooves 12 described in connection with FIGURE 1. The carcass is also equipped with vacuum sealing lugs 45 similar to the previously-described lugs 13 in FIGURE 1 and for the same purpose. Evacuating tube means 46 corresponding to the previously-described tube 23 may also be provided or if preferred the disc valve structure of FIGURE 4 may be built into the replaceable tread structure as shown in FIGURE 6.

The replaceable tread is designated by the numeral 47 in FIGURE 6 and embodies a tread portion 48 of greatly increased width, as stated. The tread design may be varied widely from conventional high speed treads to various snow or mud gripping treads, with or without the elastomer inserts 28 shown in FIGURE 2. The tread 47 may also be provided with the annular internal voids 49 in the preferred number and arrangement and for the purposes defined in connection with the voids 21 of the embodiment shown in FIGURE 1.

An additional important feature of the construction shown in FIGURE 6 resides in the provision of annular shoulder compartments 50 formed by molding during the formation of the all-elastomer tread 47. These compartments 50 have annular radial slits 51 leading from their inner sides and opening through the interior face of the tread to facilitate ready separation of the tread from the mold and to allow the introduction of inflatable inner tubes 52 into the compartments 50. The relatively soft elastomer employed for the tread 47 allows ready opening of the slits 51 for the introduction and removal of the inner tubes. The inner tubes 52 are inflated through conventional valve fittings 53 which may project through the shoulder portions of the tread as shown in the drawings. As should be obvious to anyone skilled in the art, the inflated shoulder portions of the relatively soft elastomer replaceable tread greatly increases the effectiveness of the wide tread portion 48 and renders the tire safer and subject to much less wear during cornering and the like.

Otherwise, the construction and operation of the invention in FIGURE 6 and the advantages thereof over the prior art are substantially the same as described in connection with the FIGURE 1 embodiment, and no further detailed description is believed to be necessary in connection with FIGURE 6.

FIGURE 7a shows a further modification of the invention, broadly similar to FIGURE 6, but wherein the basic tire carcass 54 is not provided with the annular rib lugs and grooves shown and described in the prior forms of the invention. The carcass 54 is however provided upon its side wall portions with vacuum sealing lugs or shoulders 55, some distance outwardly of the rim and being annular and extending around the entire circumference of the carcass. The lugs 55 are shown somewhat wedge-shaped in cross section to provide generally radial abrupt interlocking faces 56 to coact with mating portions of the tread structure presently to be described. The evacuating tube means 46 of FIGURE 6 may be employed or the disc valve structure of FIGURE 4, as preferred.

These elements are omitted in FIGURE 7a for the sake of simplicity.

The carcass 54 may have a substantially flat annular periphery 57 including shoulder portions 58 having relatively deep outwardly opening annular grooves 59 formed therein. The all-elastomer tread 60 has a tread surface 61 of increased width corresponding to the tread 48 of FIGURE 6, and shoulders 62 having annular tubeless inflation compartments 63 formed therein for the same purpose as the compartments 50 in FIGURE 6. Inner annular projections 64 are formed integral with the tread structure 60 and have annular slits 65 opening therethrough and communicating with the inflation compartments 63. The projections 64 interfit with the annular grooves 59 of the carcass and serve to lock the tread structure mechanically to the carcass and thus serve generally the same purpose as the previously-described annular rib lugs and grooves 11 and 12 described in connection with FIGURE 1.

Separately formed preferably elastomer sealing inserts 66 are installed in the tubeless inflation chambers 63 after molding of the tread 60. These inserts 66 are annular and continuous and are readily placed in the chambers 63 by the opening of the slits 65 in the relatively soft material of the elastomer tread structure which is quite flexible. The inserts 66 cover the inner ends of the slits 65 and seal the same by a mechanical wedging action when the chambers 63 are inflated through conventional valve fittings 67. The inserts 66 includes narrow annular strip portions 68 engaging within the slits 65 but terminating short of their outer ends, so as not to bottom against the carcass 54. The inserts form a very effective seal for the tubeless inflation compartments 63 and need not be cemented in place, although this may be done if desired. The inflatable shoulder compartments 63 thus described serve the same purposes in the invention as the compartments 50 shown in FIGURE 6. The tread 60 may, if desired, be provided with any number of internal voids similar to the voids 49 and 21 in the prior embodiments of the invention, near and inwardly of the tread surface 61.

The space 69 between the replaceable tread structure and the carcass 54 is evacuated through means such as those previously described but not shown in FIGURE 7a to draw the elastomer tread structure into snug substantially locked engagement with the carcass. In this connection, coacting shoulders 70 on the replaceable tread near and outwardly of the tread side wall skirts 71 are drawn into fluid tight sealing engagement with the annular sealing lugs 55, upon evacuation of the space 69. Preferably, the elastomer tread 60 should be inherently tight fitting on the carcass 54 and should require some manual stretching during installation in order to provide initial mechanical sealing prior to the application of vacuum to assure that the tread mounting is positive and secure and that no relative slippage between the carcass and tread will occur during tire operation.

An added feature of the invention in FIGURE 7a equally applicable to all embodiments of the invention is the provision of a visual indicator means to enable the user to know that the replaceable tread is effectively locked to the carcass by vacuum. This indicator means may include a small annular recess 72 or dimple in the side wall portion or portions of the carcass 54. When proper vacuum is developed in the space 69, the adjacent side wall portion 73 of the tread structure will be drawn into the dimple or recess 72 and the dimple will be visible as at 74 on the outer side or sides of the tread to indicate that the proper vacuum is present between the tread and carcass.

FIGURE 7b shows a slight modification of the construction in FIGURE 7a, wherein the carcass 75 may be formed of butyl in some instances. The carcass 75 may be conventionally formed using conventional materials and internal reinforcing fabric as in the prior forms of the invention.

In FIGURE 7b, the annular abrupt vacuum sealing rib or lug 76 may in some instances be undercut at 77 to provide an even more effective interlocking with the mating annular portion 78 of the elastomer tread under the influence of vacuum. All other parts of the invention in FIGURE 7b may be identical in construction and purpose with the corresponding parts shown and described in FIGURE 7a and in the preceding embodiments.

Quite obviously, numerous design variations of the replaceable treads are possible within the scope of the inventoni and the embodiments shown in the drawings are illustrative only of preferred forms of the invention and by no means show all of the possible variations in design.

It is to be understood that the forms of the invention herewith shown and described are to be taken as preferred examples of the same, and that various changes in the shape, size and arrangement of parts may be resorted to, without departing from the spirit of the invention or scope of the subjoined claims.

What is claimed is:

1. In a pneumatic tire structure, an inflatable tire carcass formed of reinforced elastomer of the type commonly employed for automotive tires and being relatively hard, a separately formed readily detachable all-elastomer tread body portion mounted upon said carcass in snug fitting relation thereto, said all-elastomer tread body portion being materially softer and more pliable than said carcass and fully enclosing a substantial portion of said carcass, and tubular vacuum fitting means communicating with the opposed faces of the carcass and tread body portion to establish a positive vacuum therebetween for firmly locking the carcass and tread body portion in assembled relationship, said fitting means extending exteriorly of the pneumatic tire structure and adapted for connection detachably with a vacuum supplying source.

2. A pneumatic tire structure comprising a basic tire carcass formed of conventional materials and being relatively inelastic and stiff and extremely strong in air holding capacity, a unitary relatively soft and pliable molded all-elastomer tread body portion detachably mounted upon said carcass and snugly engaging it and having mechanical interlocking engagement with the carcass, and an evacuating tube within said carcass having one end thereof communicating with the space between the carcass and tread body portion to evacuate said space for thereby securely locking the carcass and tread body portion in assembled relationship, said evacuating tube having a vacuum fitting on one end thereof exteriorly of the tire structure and adapted to be secured to a tire rim and also adapted for connection detachably with a vacuum creating means.

3. The invention as defined by claim 2, and wherein said molded tread body portion has a plurality of internal voids formed therein near and inwardly of its tread surface to render said body portion highly pliable and to reduce the heat generated in said body portion during operation of the tire structure.

4. The invention as defined by claim 2, and enlarged shoulder portions on opposite sides of the tread body portion to increase the effective tread width thereof, said shoulder portions having internal inflatable annular compartments.

5. A pneumatic tire structure comprising a relatively inelastic tire carcass adapted to be inflated, a relatively elastic and soft tread body portion detachably mounted upon said carcass and snugly engaging the carcass and interlocked therewith mechanically and by the effect of a vacuum between the opposed faces of the carcass and body portion, valve means connected with said carcass through which said vacuum may be established and maintained, said valve means comprising a tube within the carcass thereto and communicating with a port in the carcass leading to said opposed faces, and a vacuum fitting on said tube adapted to be anchored to a wheel rim upon which the carcass is mounted.

6. A pneumatic tire structure comprising a relatively inelastic tire carcass adapted to be inflated, a relatively elastic and soft tread body portion detachably mounted upon said carcass and snugly engaging the carcass and interlocked therewith mechanically and by the effect of a vacuum between the opposed faces of the carcass and body portion, valve means connected with the tread body portion through which said vacuum may be established and maintained, said valve means comprising a disc valve element mounted upon a side wall portion of the tread body portion in covering relation to a port in said side wall portion leading to said opposed faces.

7. In a pneumatic tire, an inflatable tire carcass, and an elastomeric readily detachable tread body portion mounted upon said carcass and snugly secured thereto and having a wider than conventional road-engaging tread surface, shoulder portions on the tread body portion near opposite sides thereof and inwardly of the tread surface, said shoulder portions having internal annular tubeless inflatable compartments to render effective the marginal edge portions of the tread surface, said shoulder portions having slits opening through the inner surface of the tread body portion and communicating with said compartments, and sealing inserts within said compartments and covering and sealing said slits when the compartments are inflated and being annular.

8. In a pneumatic tire, an inflatable tire carcass, an all-elastomer tread body portion including side walls and a wider than conventional tread surface detachably mounted snugly upon said carcass and having interlocking engagement therewith, means for creating and maintaining a vacuum between the opposed surfaces of the carcass and tread body portion and preventing relative movement therebetween during operation of the tire, said tread body portion including shoulders near and inwardly of the tread surface and near opposite sides thereof, said shoulders having internal annular compartments, said shoulders having annular slits leading from said compartments and opening through the inner surface of the tread body portion and being separable to facilitate separation of the tread body portion from a mold, inner tubes within said compartments insertable therein through said slits, and means to inflate said inner tubes.

9. In a pneumatic tire, an inflatable tire carcass, an all-elastomer tread body portion including side walls and a wider than conventional tread surface detachably mounted snugly upon said carcass and having interlocking engagement therewith, means for creating and maintaining a vacuum between the opposed surfaces of the carcass and tread body portion and preventing relative movement therebetween during operation of the tire, said tread body portion including shoulders near and inwardly of the tread surface and near opposite sides thereof, said shoulders having internal annular inflatable compartments, means to inflate said compartments, the tread body portion having a plurality of internal annular voids formed therein inwardly of the tread surface and between said shoulders and compartments, said tread body portion having annular slits adjacent said voids and leading therefrom and opening through the inner surface of the tread body portion to facilitate separating the latter from a mold.

10. In a pneumatic tire, an inflatable carcass, an all-elastomer tread body portion including side walls and a wider than conventional tread surface detachably mounted snugly upon said carcass and having interlocking engagement therewith, means for creating and maintaining a vacuum between the opposed surfaces of the carcass and tread body portion and preventing relative movement therebetween, said tread body portion including shoulders near and inwardly of the tread surface and near opposite sides thereof, said shoulders having internal inflatable compartments, and indicator means on the side wall of the tread body portion visible only when a proper degree of vacuum is present between the carcass and tread body portion to indicate the presence of said vacuum.

11. The invention as defined by claim 10, and wherein the indicator means is a recess in the carcass side wall into which a portion of the tread body portion side wall is drawn by said vacuum for creating a visible indicator recess on the side wall portion of the tread body portion.

12. A pneumatic tire structure comprising a pneumatic tire carcass, an elastomeric tread body portion detachably mounted upon said carcass and enclosing a major portion of the exterior surface of the carcass, and tubular vacuum fitting means extending within the interior of the carcass and communicating with the space between the carcass and the interior of the tread body portion and also extending exteriorly of the tire structure for detachable connection with a source of vacuum.

References Cited in the file of this patent

UNITED STATES PATENTS

| | | |
|---|---|---|
| 2,655,971 | Gross | Oct. 20, 1953 |
| 2,707,014 | Gramelspacher | Apr. 26, 1955 |
| 2,735,471 | McLean | Feb. 21, 1956 |
| 2,770,282 | Herzegh | Nov. 13, 1956 |
| 2,779,386 | Waters | Jan. 29, 1957 |